United States Patent [19]

Fu

[11] Patent Number: 4,880,594
[45] Date of Patent: Nov. 14, 1989

[54] VENTILATED, NO-DRIP, HOUSING FOR ELECTRICAL APPARATUS

[75] Inventor: Cheun-Yuan Fu, Cerritos, Calif.

[73] Assignee: Tatung Company of America, Long Beach, Calif.

[21] Appl. No.: 208,589

[22] Filed: Jun. 20, 1988

[51] Int. Cl.$^4$ .......................... H04N 5/64; F24F 13/08
[52] U.S. Cl. ...................................... 361/383; 312/7.2;
312/236; 174/16.1; 98/121.1
[58] Field of Search ............... 361/381, 382, 383, 384,
361/364, 365, 368, 390; 358/254; 312/7.2, 7.1,
236; 364/708; 174/16.1; 98/121.1, 42.22;
220/DIG. 6

[56] References Cited

U.S. PATENT DOCUMENTS 3,756,138  9/1973  Box ..................................... 98/121.1
4,716,493  12/1987  Zelkowitz ........................... 361/383

Primary Examiner—A. D. Pellinen
Assistant Examiner—David Osborn
Attorney, Agent, or Firm—Gene W. Arant

[57] ABSTRACT

A housing for an electrical apparatus, which is an integrally formed plastic member having a sloping wall with a number of sloping-trough depressed areas formed therein, the upper extremity of each such depressed area being deepened and having a discontinuity relative to the adjacent wall portion, thus forming an opening for the escape of warm air from inside the housing. The wall slopes in one direction relative to the horizontal, and the open face of each discontinuity-formed opening slopes in the opposite direction, so that liquid falling upon the sloping wall tends not to enter the openings but instead to flow downward along and off the exterior surface of the housing.

5 Claims, 2 Drawing Sheets

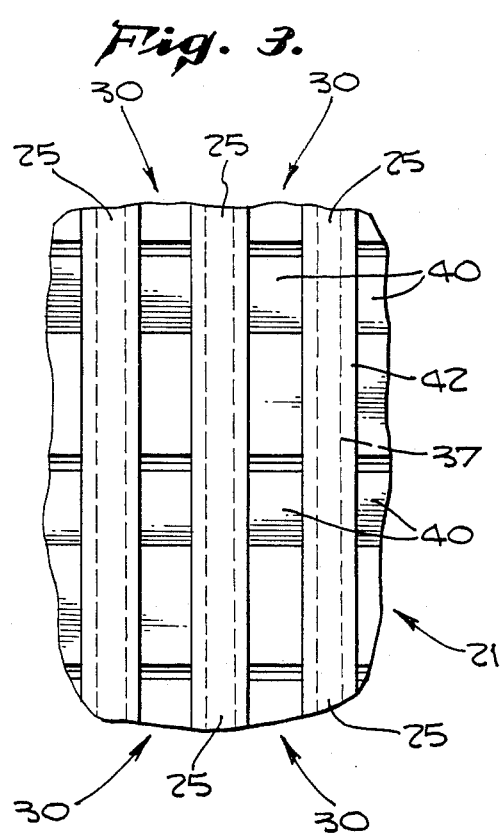
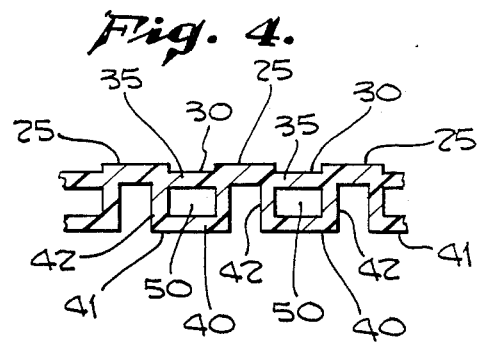
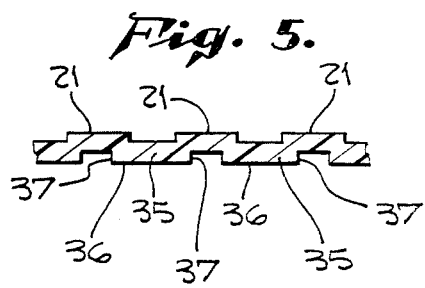
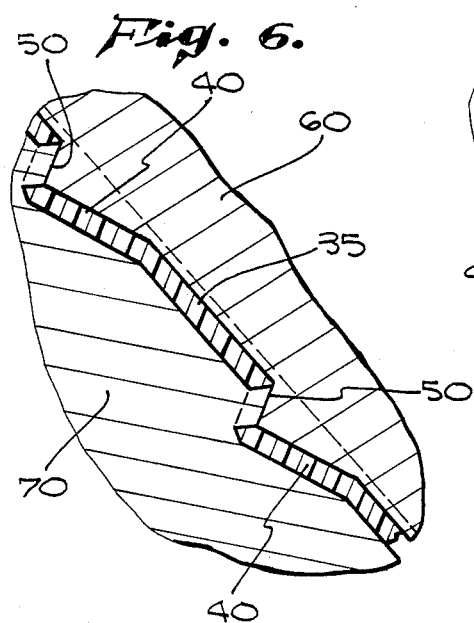
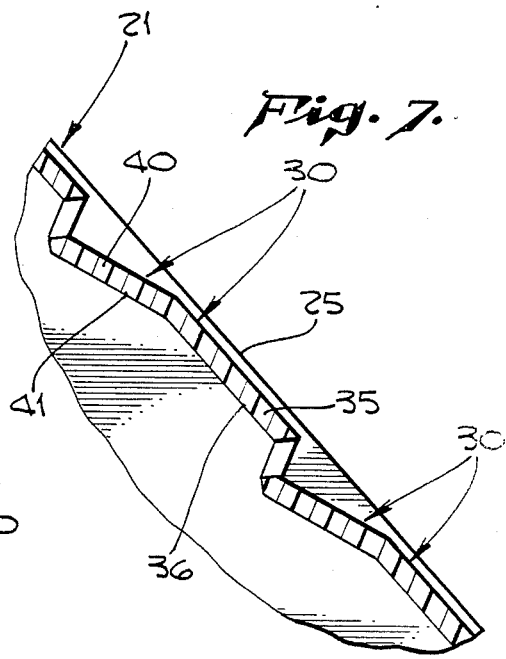

VENTILATED, NO-DRIP, HOUSING FOR ELECTRICAL APPARATUS

BACKGROUND OF THE INVENTION

Electrical apparatus often requires a protective housing of some kind, particularly in situations where the apparatus is exposed to the movement of people or other kinds of traffic which might result in accidental damage to the apparatus. Also, electrical apparatus generates heat, due to energy losses inside the circuitry, and since overheating both reduces the level of performance of the equipment and shortens its useful life, appropriate means must be provided for dissipating that heat.

Typical examples are the familiar television receiver and computer monitor, each of which contains a cathode-ray tube operating at a high voltage level. Plastic material is now commonly used to fabricate the housing for this type of equipment. Openings are provided in the housing, generally at or near its upper surface, so that air which is warmed inside the housing will have an opportunity to flow upward and escape from the housing, thus carrying with it the undesired excess heat.

There is, however, a further problem which hitherto appears to have escaped attention. This is the occasional instance of an office worker setting a coffee cup or other drink container on top of the housing, when suddenly, and unexpectedly, the container spills a quantity of liquid which then flows downward through the cooling openings and into the very equipment that the housing was designed to protect. Needless to say, the undesired presence of liquid in electrical circuitry can cause short circuits and other difficulties.

SUMMARY OF THE INVENTION

The present invention provides a housing for a computer monitor or similar electrical apparatus, which is integrally formed from plastic material, which contains appropriate openings in its upper portion to allow warm air to escape from inside the housing, but with the openings being of such shape and arrangement that they will tend to prevent liquid from running or dripping through the wall of the housing and into its interior.

According to the invention an upper wall of the housing is inclined in a sloped position, as is conventional. A plurality of sloping-trough-like depressed areas are formed in the sloping wall, each depressed area having a bottom end which lies substantially in the plane of the adjacent wall portion, extending upwardly and becoming continuously depressed to a greater depth relative to the adjacent wall portion, and then at its upper extremity having a discontinuity relative to the adjacent wall portion such as to form an opening whose face slopes in a direction opposite to the slope of the wall.

The invention also provides an efficient and inexpensive method for manufacturing housings of the foregoing type.

Thus, the object and purpose of the invention is to provide an improved housing for electrical apparatus, which has cooling openings of a no-drip configuration, and also to provide a method for manufacturing same.

DRAWING SUMMARY

FIG. 3 is a fragmentary plan view taken on the line 3—3 of FIG. 2;

Figure 2:
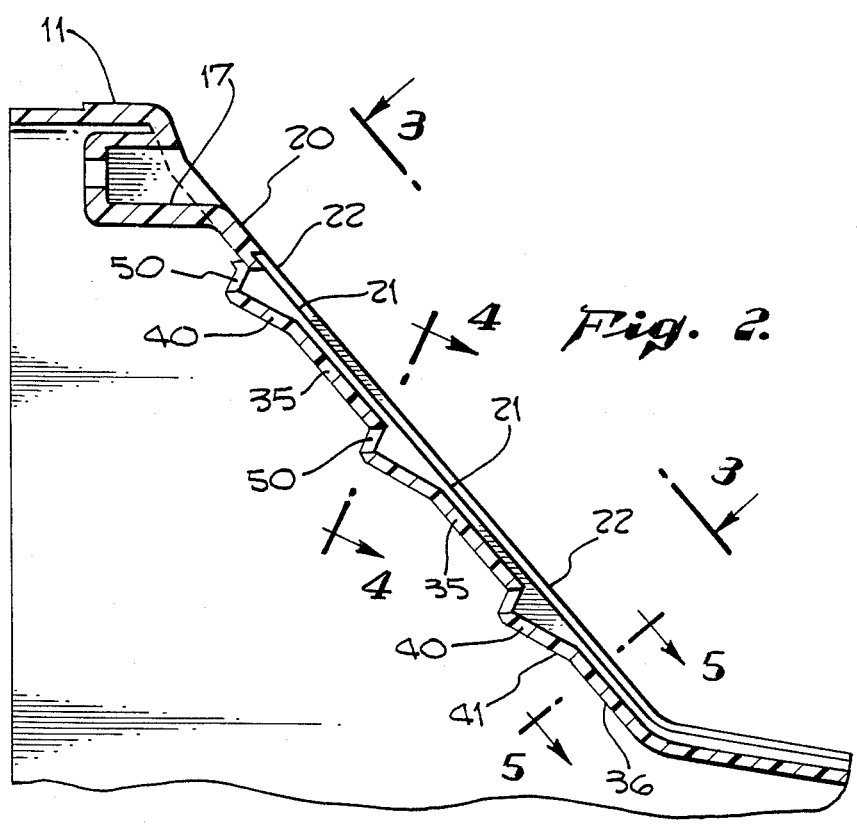
FIG. 2 illustrates the housing as modified in accordance with the present invention, and is an enlarged fragmentary view of its upper portion taken in cross-sectional elevation.

FIG. 4 a fragmentary cross-sectional view taken on the line 4—4 of FIG. 2;

FIG. 5 is a fragmentary cross-sectional view taken on the line 5—5 of

FIG. 6 illustrates the method of manufacture of the housing of FIG. 2, in a fragmentary cross-sectional view of a portion of the housing showing the tooling that forms the openings, being enlarged somewhat more than FIG. 2; and FIG. 7 is a view like FIG. 6 but showing that housing portion after the tooling has been removed.

DETAILED DESCRIPTION

Figure 1:
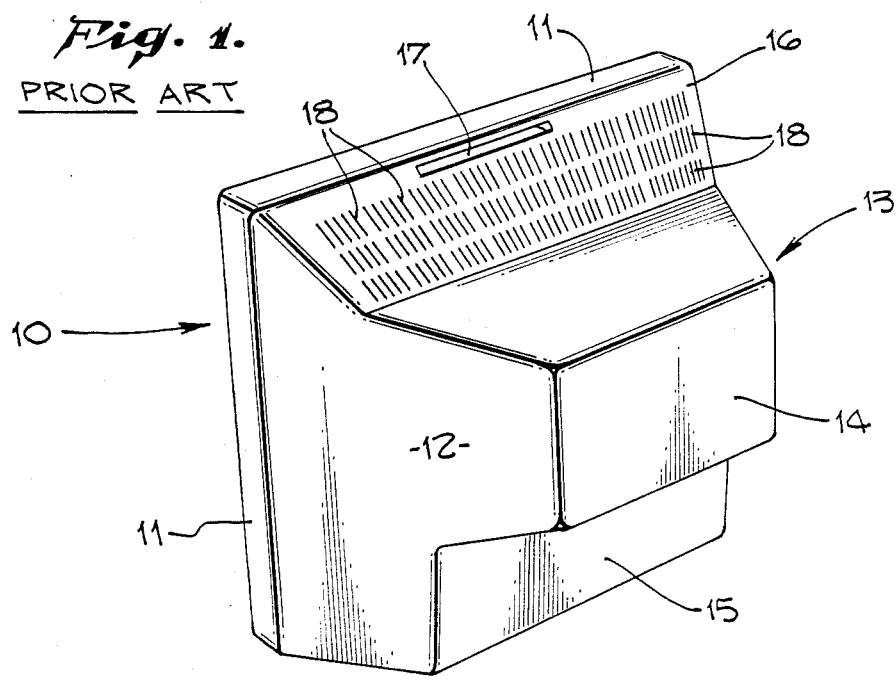
FIG. 1 is a perspective view of a computer monitor housing according to the prior art, shown when in its normal upright position.

Referring now first to FIG. 1 of the drawings, the conventional or prior art housing or cover will be described. The entire housing or cover is identified by numeral 10, and includes a peripheral flange 11, side walls 12, a rearwardly projecting portion 13 having a vertical rear wall 14, and an inset rear wall 15 located beneath the rear projection 13. As is well known in the art, the purpose of the rearward projection 13 of cover 10 is to provide a sufficiently long horizontal space inside the housing for a conventional cathode ray tube, which requires a rather long pathway for accelerating the electrons that impinge upon the screen of the computer terminal or television receiver to form the picture or other information. Immediately above the rear projection 13, and joining its upper surface to the uppermost portion of peripheral flange 11, is a sloped upper wall 16. This sloped upper wall has a top slot or groove 17 for fastening it to the apparatus which it covers. It also has, beneath the slot or groove 17, a plurality of openings 18 whose function and purpose is to permit the escape of warm air from the interior of the housing, in order to prevent an excessive ambient temperature during the operation of the electrical apparatus contained therein.

Reference is now made to FIGS. 2 through 5, inclusive, illustrating the housing 10, which is modified in accordance with the invention. Peripheral flange 11 and the slot or groove 17 remain unchanged. The sloping upper wall is identified by numeral 20. The wall 20 has a central portion 21 which contains all of the cooling openings, and which is slightly depressed relative to lateral end portions 22 of the wall, as seen only in FIG. 2. The purpose of the slight depression of the central portion 21 is to permit a snap-on dust cover, not shown, to be placed over the cooling openings of the cover when the apparatus is being shipped or stored. The snap-on dust cover is a previously known feature, and its use in conjunction with the present invention is optional.

The central portion 21 of sloping wall 20 includes a plurality of parallel flat wall sections 2 that extend longitudinally up and down the slope of the wall portion 21. As best seen in FIG. 3, the wall sections 25 are fairly narrow and are spaced apart by a distance about equal to their width. Between each two adjacent flat wall sections 25 there is a depressed wall section 30. Each depressed wall section 30 includes a series of semi-depressed trough-like areas 35 interspersed with depressed sloping-trough areas 40, in a recurring pattern.

The detailed features are shown in FIGS. 2 through 5, inclusive.

More specifically, each semi-depressed area 35 has a bottom wall surface 36 and outer side wall surfaces 37 that are of constant depth throughout the length of the area 35. Each of the sloping-trough areas 40 has a bottom wall surface 41 and outer side walls 42. The upper end of each semi-depressed area 35 joins directly to the lower end of the next sloping-trough area 40, their bottom wall surfaces 36, 41, being contiguous at that point. See FIGS. 2 and 7. Then as the sloping-trough area 40 extends upward along the slope of wall portion 21, the depth of its side walls 42 increases continuously. At the upper extremity of area 40, there is a discontinuity 50 between the bottom walls, resulting in an opening whose face is somewhat perpendicular to the surface of wall 21, but more specifically, at an angle of about sixty degrees relative thereto.

Thus, the longitudinal axis of each opening 50, through which warm air is intended to escape, is aligned somewhat parallel to the face of wall portion 21, but more specifically, at an angle of about thirty degrees relative thereto. The angle of slope of wall 20 is about forty-five degrees, hence the open faces of the openings 50 slope in a direction opposite to the slope of wall 20. In other words, liquid running-down one of the shallow troughs 35 will tend to flow, vertically downward upon upper surface (unnumbered) of the next succeeding sloping-trough area 40, and will tend to flow past the associated opening 50 which is inclined at an angle of about fifteen degrees rearwardly from the vertical. Further, the structure is easily cleaned and substantially dust-proof. This may be best understood by reference to FIGS. 2 and 7 which show the preferred angular position of the structure.

At the uppermost extremity of all of the depressed areas 30, the discontinuity of the sloping-trough area 40 is with wall portion 20. At the lowermost extremity of all of the depressed areas 30, each trough-like 35 continues downward, as per FIG. 2 and is at a reduced elevation relative to wall surface 21.

The invention is illustrated with a combination of trough-like depressed areas 35 and sloping-trough areas 40, and it will be understood that the significant function is performed by the combination of these areas. If desired, the lower end of each sloping-trough area may lie substantially in the same plane as wall 20 or wall portion 21.

It is significant that in the operational position of the housing, the angle of slope of wall 21, plus the angle of slope of the face of opening 50 relative to that wall, is somewhat more than ninety degrees. Therefore, spilled liquids will tend not to enter the openings, but instead to run downward along and off the exterior surface of the wall 21.

FIGS. 6 and 7 illustrate the method of manufacture in accordance with the invention. A pair of dies 60, 70, are used to form the housing structure. These two dies meet in abutting relation along the face of each discontinuity or opening 50. FIG. 6 shows the positions of the dies when forming the part, and FIG. 7 shows the part after it is formed.

While the invention has been illustrated in detail in one of its forms, it is to be understood that the scope of the invention is nevertheless to be measured only by the appended claims.

I claim:

1. In a housing for an electrical apparatus, which housing comprises an integrally formed plastic member having a predetermined orientation when installed upon the apparatus, and having a sloping wall with openings therein for the escape of warm air from inside the housing, the improvement comprising:
    a plurality of sloping-trough depressed areas formed in said sloping wall, each of said sloping-trough depressed areas having a bottom end which lies substantially in the plane of the adjacent wall portion, then extending upwardly and becoming continuously depressed to a greater depth relative to said adjacent wall portion, and at its upper extremity having a discontinuity relative to said adjacent wall portion, thereby forming one of the openings;
    said sloping wall, in the predetermined orientation of the housing, having a first angle of slope relative to the horizontal, each said discontinuity-formed opening having a second angle of slope relative to said sloping wall, and the sum of said two angles being somewhat greater than ninety degrees, so that liquid falling upon said sloping wall tends not to enter said openings but instead to flow downward along and off the exterior surface of the housing.

2. The invention of claim 1 wherein said second angle of slope is less than ninety degrees.

3. An integrally formed plastic housing for an electrical apparatus, including a peripheral flange, side walls, a rearwardly projecting portion for housing a cathode ray tube, said rearwardly projecting portion having a vertical rear wall, an inset rear wall located beneath said rear projection, a sloped upper wall immediately above said rear projection and joining its upper surface to the uppermost portion of said peripheral flange, said sloped upper wall having a top slot or groove for fastening it to the apparatus which it covers, and when so fastened sloping at an angle of the order of forty-five degrees;
    said sloped upper wall also having, beneath said slot or groove, a plurality of openings whose function and purpose is to permit the escape of warm air from the interior of the housing, in order to prevent an excessive ambient temperature during the operation of the electrical apparatus contained therein;
    a portion of said sloping wall including a plurality of parallel flat wall sections that extend longitudinally up and down the slope of said wall portion, said wall sections being fairly narrow and being spaced apart by a distance about equal to their width;
    there being a depressed wall section between each two adjacent flat wall sections, each depressed wall section including a series of semi-depressed trough-like areas interspersed with depressed sloping-trough areas in a recurring pattern, each semi-depressed area having a bottom wall surface and having outer side wall surfaces that are of constant depth throughout their length, each of the sloping-trough areas having a bottom wall surface and outer side walls, the upper end of each semi-depressed area joining directly to the lower end of the next sloping-trough area such that their bottom wall surfaces are contiguous at that point; and
    as each sloping-trough area extends upward along the slope of said wall portion, the depth of its side walls increasing continuously so that at its upper extremity, there is a discontinuity between the bottom walls of the semi-depressed area and the sloping-trough area, resulting in an opening whose face is sloped at an angle of about sixty degrees relative to the surface of said sloping wall;

the angle of slope of said sloping wall portion, in the operational position of said housing, plus the angle of slope of said faces of said openings relative to said sloping wall portion, being somewhat more than ninety degrees, so that spilled liquids will tend not to enter said openings, but instead to run downward along and off the exterior surface of said housing.

4. A housing for an electrical apparatus, which is an integrally formed plastic member having a sloping wall with a plurality of sloping-trough depressed areas formed therein, the upper extremity of each said sloping-trough depressed area being deepened so as to have a discontinuity relative to the adjacent wall portion, thereby forming an opening for the escape of warm air from inside the housing, and the wall sloping in one direction relative to the vertical while the open face of each discontinuity-formed opening slopes in the opposite direction so that liquid falling upon the sloping wall tends not to enter the openings but instead to flow downward along and off the exterior surface of the housing.

5. In a housing for an electrical apparatus, an integrally formed plastic member which is ventilated so as to permit the escape of rising warm currents of air, but at the same time to resist the entry of liquids accidentally spilled from above;

said plastic member forming a sloping wall with a plurality of sloping-trough depressed areas formed therein, the upper extremity of each said sloping-trough depressed area being deepened so as to have a discontinuity relative to the adjacent wall portion, which thereby forms an opening for the escape of warm air from inside the housing; and said sloping wall itself being sloped in one direction relative to the vertical, while the faces of all of said openings are sloped in the opposite direction relative to the vertical, so that liquid falling upon said sloping wall tends not to enter said openings but instead to flow downward along and off the exterior surface of said member.

* * * * *